United States Patent [19]
Myers, Sr.

[11] 3,964,346
[45] June 22, 1976

[54] LIMITED SLIP DIFFERENTIAL INCLUDING CONICAL PINION AND SIDE GEARS

[75] Inventor: Albert F. Myers, Sr., Warren, Mich.

[73] Assignee: Aspro, Incorporated, Westport, Conn.

[22] Filed: Nov. 20, 1974

[21] Appl. No.: 525,484

[52] U.S. Cl. .................................................. 74/711
[51] Int. Cl.² ........................................... F16H 1/44
[58] Field of Search ........................... 74/710.5, 711

[56] References Cited
UNITED STATES PATENTS

| | | | |
|---|---|---|---|
| 3,008,350 | 11/1961 | Misener | 74/710.5 |
| 3,186,258 | 6/1965 | Meldola | 74/710.5 |
| 3,438,282 | 4/1969 | Thornton | 74/711 |

Primary Examiner—Benjamin W. Wyche
Assistant Examiner—Lance M. Chandler
Attorney, Agent, or Firm—Lawrence E. Laubscher

[57] ABSTRACT

A self-loading limited slip differential is disclosed including differential pinion and side gears having conical back surfaces, and torque-responsive wedge means operable by said pinion gears for applying frictional torque bias to the driven shafts via the side gears. The wedge means includes conical wedge elements that are displaced inwardly by the pinion gears upon the application of torque to the differential casing to force the side gears apart into frictional engagement with corresponding conical portions of the wall surfaces of the differential casing.

9 Claims, 3 Drawing Figures

U.S. Patent  June 22, 1976  3,964,346
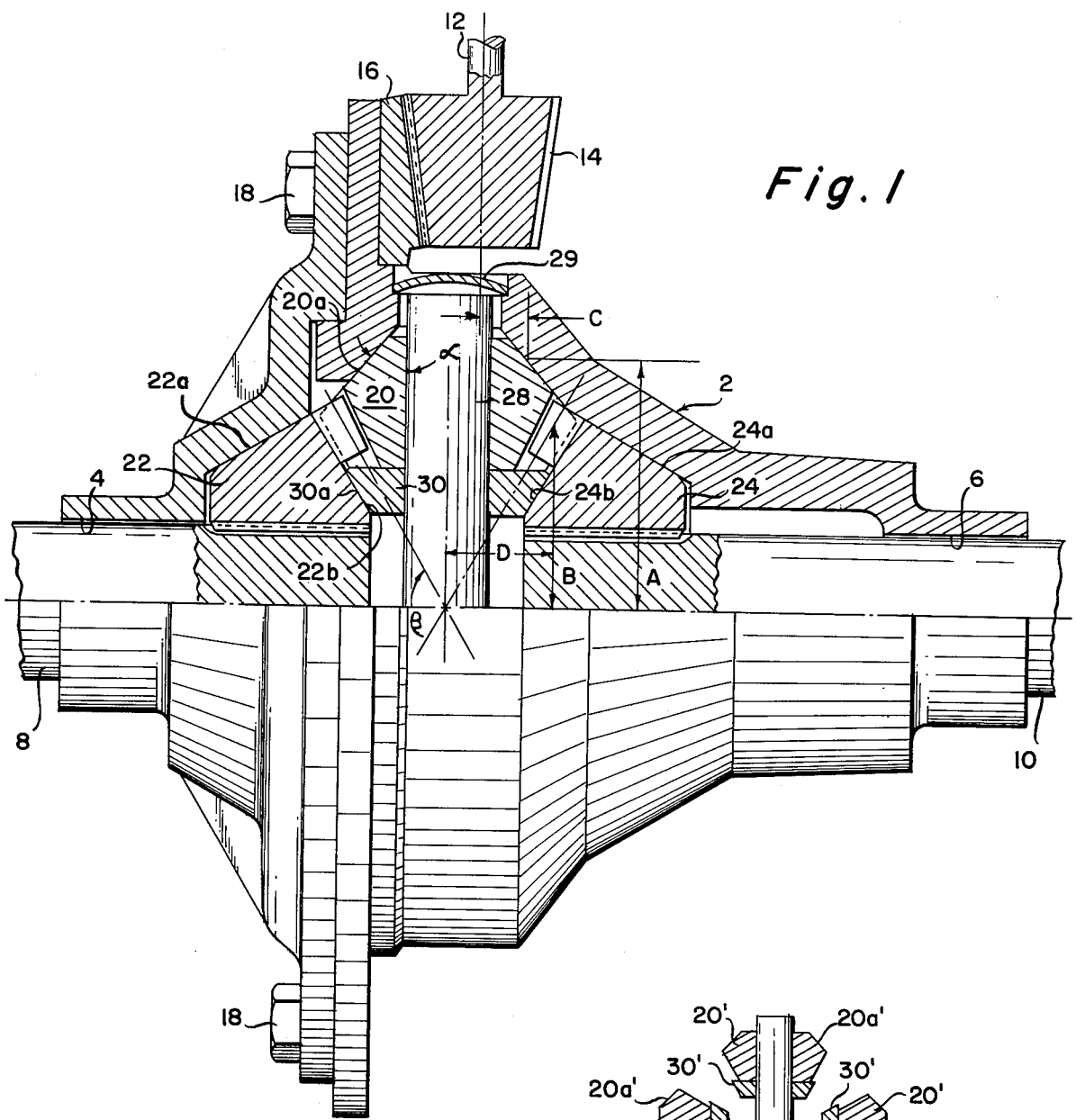
Fig. 1
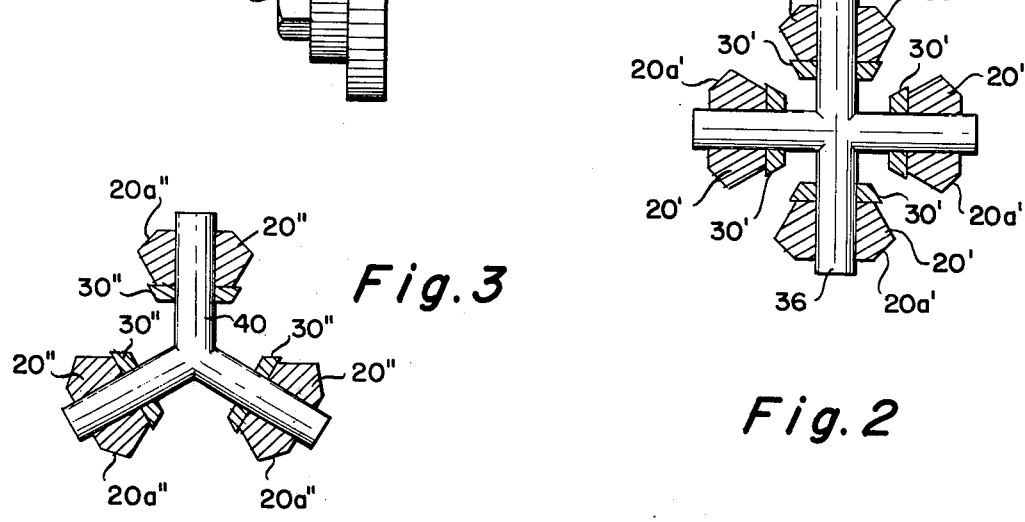
Fig. 3
Fig. 2

LIMITED SLIP DIFFERENTIAL INCLUDING CONICAL PINION AND SIDE GEARS

FIELD OF THE INVENTION

This invention relates to a self-loading limited slip differential apparatus including differentil pinion and side gears having conical back surfaces, torque-responsive wedge means being provided which are operable by the pinion gears to apply friction torque bias to the driven shafts via the side gears.

REFERENCE TO COMPARISON APPLICATION

The present invention relates to a limited slip differential apparatus of a type similar to that disclosed in my copending U.S. Pat. application Ser. No. 518,880, now U.S. Pat. No. 3,930,424, filed Oct. 29, 1974.

BRIEF DESCRIPTION OF THE PRIOR ART

As evidenced by the prior patents to Ottemann Ser. No. 3,606,803 and Ferbitz et al Ser. No. 3,264,901, limited slip differential mechanisms for applying frictional torque bias to the driven shafts are well known in the patented prior art. Furthermore, the use of differential pinion and/or side gears having conical and/or partly spherical back surfaces is illustrated in the patents to Engle Ser. No. 3,742,784, Brandon Ser. No. 2,924,125 and Dodge Ser. No. 3,350,961, among others.

In the limited slip differentials of the prior art, relatively complex and expensive clutch pack or spring loading devices are provided for achieving the desired limited slip differential operation. The present invention was developed to provide an improved self-loading limited slip differential which avoids the use of the clutch or preloading spring means of the prior art and which is of simple, durable and relatively inexpensive construction.

SUMMARY OF THE INVENTION

The primary object of the present invention is to provide a limited slip differential including differential pinion and side gears having conical back surfaces, torque-responsive wedge means being provided that are operable by the pinion gears upon the application of torque to the differential casing to apply frictional torque bias to the driven shafts via the side gears. To this end, the back surfaces of the pinion and side gears have conical surfaces arranged for cooperation with corresponding conical surfaces on the wall of the chamber formed in the differential casing. The cone angle of the pinion gear is such that the pinion gear is displaced inwardly upon the application of torque to the casing, thereby to force wedge means between the side gears and thereby displace the same axially apart into frictional engagement with the casing chamber wall surface, whereby friction torque bias is applied to the driven shafts via the side gears. In addition to the spreading action by the wedge means, the separating forces between the gear teeth add to the bias by creating their own axial force on the side gears. Furthermore, additional bias is created by the friction between the pinion and its conical seat in the casing.

In accordance with a more specific object of the invention, the pinion gears are journalled on pinion shaft means to prevent skewing of the pinions as they are displaced inwardly upon the application of torque to the differential casing. The wedge means includes wedge elements that are journalled on the pinion shaft means adjacent the side gears, said wedge elements having conical surfaces that engage corresponding conical surfaces on the adjacent ends of the side gears. Two or more pinion gears may be provided. When two pinion gears are provided, the pinion shaft means comprises a pinion shaft that extends diametrically across the casing chamber. When more than two pinion gears are provided, the pinion shaft means comprises a multi-legged spider element the legs of which are equally angularly spaced. Thus, when the differential includes three pinion gears, a spider having three legs arranged at a relative angle of 120° is provided, and when two pairs of pinion gears are provided, the pinion shaft means comprises a spider having four orthogonally arranged legs.

The present invention offers the advantage that adequate friction torque bias is achieved without the use of preload springs, thereby avoiding the unpleasant steering reaction that spring bias gives (especially at road load when driving torque is normally quite low). The self-loading design of the present invention is relatively inexpensive, rugged and fail-safe, and the unit is compact enough to fit into existing axle housings. The bias is the same regardless of which rear wheel is spinning (a fact that is not true of a single clutch pack type of limited slip differential). The bias is immediate, without requiring initial or continued spinning of one wheel.

In accordance with another important advantage of the invention, the limited slip differential of the present invention is self-compensating during use. As the side gears gradually move outwardly due to wear on their conical surfaces, the conical wedge elements and the pinions move correspondingly inwardly, thereby maintaining the proper depth of tooth engagement.

In the four-pinion embodiment, high torque capacity is provided for a given casing size. Thus the application of the present invention may be extended to heavy duty truck axles and inter-axle differentials. The absence of preload or excessive bias is especially important in this case, because in a short wheelbase truck understeer is intolerable if bias is too high, and an articulated vehicle such as a road scraper cannot be steered if bias is too high.

Owing to the frictional torque bias applied to the side gears and the driven shafts under load, the vehicle can still be propelled if one wheel is in a spin out condition (i.e., on slippery pavement, mud, gravel or the like), thereby offering a safety advantage (as, for example, when pulling out from a ramp onto a freeway). Similarly, with one wheel in a spin-out condition during deceleration, the vehicle can still be retarded by engine friction. Spinning of the right rear wheel on acceleration (as torque from the propeller shaft tries to lift it), and spinning of the inner wheel on a turn (as centrifugal force tries to lift it) are eliminated.

BRIEF DESCRIPTION OF THE DRAWINGS

Other objects and advantages of the invention will become apparent from a study of the following specification when viewed in the light of the accompanying drawings, in which:

FIG. 1 is a longitudinal sectional view of a two-pinion embodiment of the limited slip differential of the present invention;

FIG. 2 is a detailed transverse view of a four-pinion embodiment of the invention; and FIG. 3 is a detailed transverse view of a three-pinion embodiment of the invention.

Referring first more particularly to FIG. 1, the limited slip differential of the present invention includes a differential casing 2 containing a chamber and including a pair of aligned bores 4 and 6 for receiving the adjacent ends of a pair of driven shafts 8 and 10, respectively. The casing is rotated about the axis of said aligned bores by driving shaft 12, driving pinion 14 and ring gear 16. In the illustrated embodiment, the casing consists of two parts connected by the bolts 18. The casing is connected with the driven shafts via differential pinions 20 and side gears 22 and 24 that are splined to the driven shafts 8 and 10, respectively, said pinion and side gears having enmeshing teeth. The back surfaces 20a of the differential pinions are conical and engage corresponding conical surfaces on the wall of the casing chamber. Similarly, the back surfaces 22a and 24a of the side gears 22 and 24, respectively, are conical and are adapted for engagement with corresponding conical surfaces on the wall of the casing chamber. The differential pinions are diametrically arranged on the casing and are journalled on a pinion shaft 28 that extends diametrically across the casing chamber and is prevented from axial displacement by Welsh plugs 29.

In accordance with a characterizing feature of the present invention, the cone angle $\alpha$ of the conical back surface of the pinion gears is so selected that upon the application of torque to the differential casing, the pinion gears are displaced inwardly. Conical wedge elements 30 are journalled on the pinion shaft adjacent the differential pinion gears, said wedge elements having convergent conical surfaces 30a that engage corresponding conical surfaces 22b and 24b on the adjacent ends of the side gears 22 and 24, respectively. Consequently, as the pinion gears are displaced inwardly upon the application of torque to the casing, the wedge elements are displaced inwardly by the pinion gears to displace the side gears axially apart, thereby forcing the conical back surfaces of the side gears into frictional engagement with the corresponding conical wall surfaces of the casing chamber.

Referring to FIG. 1, the cone angle $\alpha$ is so selected as to produce the relationship $$(BD\sin\alpha/AX) > \tan\delta\sin\beta$$

where:
$$X = \sqrt{(D\cos\alpha)^2 - (\mu C\tan\delta\cos\beta)^2}$$

$\alpha$ = the cone angle of the back surface of the pinion gear $\beta$ = the pitch angle of the differential pinion $\mu$ = the coefficient of friction $\delta$ = the pressure angle of the gear teeth A = the distance from axle centerline to the middle of the conical contact area between the pinion and casing B = the distance from axle centerline to the middle of the pinion-to-side gear tooth engagement C = the distance from pinion centerline to the middle of the conical contact area between the pinion and casing, and D = the distance from pinion centerline to the middle of the pinion-to-side gear tooth engagement.

Operation

Upon the application of torque to the casing 2 via drive shaft 12, pinion 14 and ring gear 16, the differential pinion gears 20 are displaced inwardly by the cooperation between the conical wall surfaces of the casing chamber and the conical back surfaces 20a of the pinion gears. Wedge elements 30 are biased inwardly by the differential pinion gears to force the side gears axially apart to cause frictional engagement between the conical back surfaces 22a and 24a of the side gears 22 and 24, respectively, whereby frictional torque bias is applied to the driven shafts 8 and 10 splined to the side gears, respectively. In addition to the spreading action by the wedge means, the separating forces between the gear teeth add to the bias by creating their own axial force on the side gears. Furthermore, additional bias is created by the friction between the pinion and its conical seat in the casing. The driven shafts then rotate at the same speed, and upon the occurrence of a slip condition by one of the wheels associated with the driven shafts, the shafts will rotate at relative speeds determined by the bias ratio of the apparatus.

In the four-pinion embodiment of FIG. 2, the differential pinions 20' and conical wedge elements 30' are journalled upon the orthogonally arranged legs of a spider element 36. As in the embodiment of FIG. 1, when torque is applied to the differential casing, the cooperation between the conical wall surfaces of the casing chamber and the conical back surfaces 20a' of the differential pinion gears cause the pinion gears and wedge elements 30' to be displaced inwardly, thereby forcing the side gears apart into frictional engagement with the corresponding casing chamber conical surfaces, whereby friction torque bias is applied to the driven shafts.

Similarly, in the three-pinion embodiment of FIG. 3, the differential pinions 20'' and conical wedge elements 30'' are journalled upon the legs of a spider element 40, said legs being angularly arranged at an angle of 120° relative to each other.

In the embodiments of FIGS. 1–3, respectively, the pinion shaft means (i.e., the pinion shaft 28, the four-legged pinion spider 36, and the three-legged spider 40, respectively) prevent skewing of the differential pinion gears as they are displaced inwardly upon the application of torque to the differential casing. While three and four legged spider elements have been illustrated and described, it will be apparent that multi-legged spider embodiments including five or more legs could be provided. In the embodiments including multi-legged spider elements, it is not necessary to provide Welsh plugs or to have the ring gear extend axially over the pinion holes. The casing is split at the pinion centerlines to allow assembly of the spider into the differential.

While in accordance with the Patent Statutes, the preferred form and embodiments have been illustrated and described, it will be apparent that changes may be made without deviating from the inventive concepts set forth above.

What is claimed is:

1. A limited slip differential assembly for connecting a driving shaft with a pair of driven shafts, comprising
   a. a differential casing containing a chamber, and a pair of aligned bores communicating with said chamber for receiving the adjacent ends of the driven shafts, respectively;
   b. means adapted for connection with said driving shaft for rotating said casing about the axis of said aligned bores;

c. differential gearing means contained in said casing chamber for connecting said casing with the driven shafts, including
  1. a plurality of differential pinion gears rotatable relative to said casing; and
  2. a pair of side gears adapted for non-rotatable connection with said driven shafts, respectively, said pinion and side gears having enmeshing teeth; and
d. torque-responsive means for applying friction torque bias to the driven shafts via said side gears, each of said pinion and side gears having conical back surfaces which converge toward the adjacent wall surface of the casing chamber, said casing chamber wall surface having conical portions which correspond with the conical back surfaces of said pinion and side gears, respectively, the cone angle of the conical back surface of said pinion gears and the corresponding conical portion of the casing chamber wall surface being such that said pinion gears are displaced axially inwardly toward said side gears upon the application of torque to said casing, and wedge means responsive to the inward movement of said pinion gears for displacing said side gears axially apart into frictional engagement with the corresponding casing chamber conical wall surfaces.

2. Apparatus as defined in claim 1, wherein said wedge means comprises a plurality of conical wedge elements associated with said pinion gears, respectively, each of said conical wedge elements being colinearly arranged relative to the associated pinion between said side gears, said conical wedge element having a conical surface that converges toward said side gears, the adjacent ends of said side gears having corresponding conical surfaces arranged for engagement by said wedge element.

3. Apparatus as defined in claim 2, and further including a pinion shaft extending diametrically across said casing chamber, a pair of said pinion gears containing axial bores and being journalled on said pinion shaft, whereby skewing of the pinion gears upon the application of torque to the casing is prevented.

4. Apparatus as defined in claim 3, wherein the conical wedge elements associated with said diametrically arranged pinion gears are also journalled on said pinion shaft adjacent the inner end of said pinion gears, respectively.

5. Apparatus as defined in claim 2, wherein said differential pinion gears contain axial bores, and further including multi-legged spider means upon the legs of which said pinion gears are journalled, respectively, whereby skewing of the pinion gears upon the application of torque to the casing is prevented.

6. Apparatus as defined in claim 5, wherein the conical wedge elements associated with said pinion gears are also journalled on the corresponding legs of said spider shaft adjacent the inner end of said pinion gears, respectively.

7. Apparatus as defined in claim 6, wherein the number of pinion gears is three, said spider means including three legs relatively arranged at an angle of 120°, respectively.

8. Apparatus as defined in claim 6, wherein the number of pinion gears is four, said spider means including four orthogonally arranged legs.

9. Apparatus as defined in claim 1, wherein the cone angle of the back surface of said pinion gears is such as to produce the relationship $(BD\sin\alpha/AX) > \tan\delta\sin\beta$ where:

$X = \sqrt{(D\cos\alpha)^2 - (\mu C \tan}$ $\alpha$ = the cone angle of the back surface of the pinion gear
$\beta$ = pitch angle of the differential pinion
$\mu$ = coefficient of friction
$\delta$ = pressure angle of gear teeth
A = distance from axle centerline to middle of conical contact area between pinion and casing
B = distance from axle centerline to middle of pinion-to-side gear tooth engagement
C = distance from pinion centerline to middle of conical contact area between pinion and casing
D = distance from pinion centerline to middle of pinion-to-side gear tooth engagement.

* * * * *